United States Patent [19]
Argandona

[11] Patent Number: 5,533,641
[45] Date of Patent: Jul. 9, 1996

[54] LOCKING COVER ASSEMBLY

[76] Inventor: Toby Argandona, 21221 Running Branch Rd., Diamond Bar, Calif. 91765

[21] Appl. No.: 133,889

[22] Filed: Oct. 12, 1993

[51] Int. Cl.[6] .................................................. B65D 45/28
[52] U.S. Cl. ........................ 220/323; 220/248; 220/251; 220/378
[58] Field of Search .................................... 220/323, 245, 220/247, 248, 251, 378

[56] References Cited

U.S. PATENT DOCUMENTS

| | | | |
|---|---|---|---|
| 737,667 | 9/1903 | Schunck | 220/248 |
| 916,354 | 3/1909 | Mueller et al. | 220/248 |
| 2,015,788 | 10/1935 | Foster et al. | 220/248 |
| 2,436,016 | 2/1948 | Myers | 220/248 |
| 3,394,834 | 7/1968 | Cigliano | 220/251 |
| 4,298,204 | 11/1981 | Jinkins | 220/378 X |
| 5,201,151 | 4/1993 | LeBlanc et al. | 52/20 |

FOREIGN PATENT DOCUMENTS

733661  3/1943  Germany .............................. 220/323

Primary Examiner—Jes F. Pascua
Attorney, Agent, or Firm—Boniard I. Brown

[57] ABSTRACT

A locking cover assembly has a cover supporting base containing an opening circumferentially surrounded by a cover seat, and a cover movable to and from a closed position on the base in which the cover engages the cover seat to close the base opening. A cover locking mechanism on the cover includes cover locking levers mounted on the inner side of the cover, and a lock actuator movable through the cover and connected to the locking members for moving the levers between cover locking positions in which the levers are extended to engage the base about the base opening and clamp the cover to the base and cover unlocking positions in which the levers are retracted from the base to permit removal of the cover from the base.

28 Claims, 3 Drawing Sheets

LOCKING COVER ASSEMBLY

BACKGROUND OF THE INVENTION

1. Field of the Invention

This invention relates generally to cover assemblies for receptacles and the like and more particularly to an improved cover assembly of this class embodying a cover supporting base having an opening, a removable cover for closing the base opening, and a novel releasable locking mechanism for locking the cover to the base. The invention also provides a novel cover for the cover assembly.

2. Discussion of the Prior Art

It will become evident as the description proceeds that the improved cover assembly of this invention may be used for a variety of purposes. The cover assembly is primarly intended, however, for use as a closure for wells of the kind which are utilized at hazzardous fluid handling facilities, particularly motor vehicle service stations, to service underground storage tanks, that is fill the tanks and vent vapors from the tanks. Such underground tank servicing wells are used at motor vehicle service stations to contain the upper capped ends of the fill tubes and vent tubes leading to underground fuel storage tanks and, in many cases, associated valves, electrical equipment, pumps, and the like. The cover assembly will be described in the context of this service station use.

An underground fuel storage tank of the kind installed at motor vehicle service stations has an underground tank proper and a fill tube extending to ground level through which the tank is filled with the fuel to be stored. A vent tube also extends from the tank to ground level through which fuel vapor may be vented from the tank. These fill and vent tubes have upper open ends which are normally sealed by removable caps. A typical motor vehicle service station has several such underground fuel storage tanks. The upper capped ends of the tank fill and vent tubes are generally situated within a storage tand servicing well recessed into a concrete apron or other finished ground level surface in such a way as to enable easy access to the capped ends of the tubes and yet shield these ends against damage by surface traffic. A service station underground fuel tank is filled from a fuel delivery tank truck through a delivery hose which is coupled to the open end of the tank fill tube after removal of the cap from the fill tube. The upper end of the vent tube is connected to the delivery truck through a vapor hose through which fuel vapor displaced from the tank during filling is conducted back to the delivery truck.

When filling a service station fuel tank, a small amount of fuel spillage commonly occurs, particularly during coupling and uncoupling of the delivery hose from the tank fill tube. This spillage may be due to either or both leakage at the coupling between the hose and the fill tube and draining of standing liquid from the hose during coupling and uncoupling of the hose to and from the fill tube A few years ago, this fuel spillage problem was dealt with by simply hosing off the fuel from surface onto which the spill had occurred. Later environmental legislation made this practice illegal and mandated the use of so-called spill containment devices to collect any fuel spillage. The service station tank servicing wells referred to above serve such a spill containment function. Examples of existing spill containment devices wells are disclosed in the following patents:

U.S. Pat. No. 4,593,714 dated Jan. 10, 1986 to Madden.

U.S. Pat. No. 4,762,440 dated Aug. 9, 1988 to Argandona.

U.S. Pat. No. 4,842,443 dated Jan. 27, 1989 to Argandona.

An underground tank servicing well must satisfy other requirements in addition to the basic fuel spillage containment requirements mentioned above. One of these additional requirements resides in the fact that the well, when not in use for filling an underground fuel storage tank, must be closed by a removable cover which is sealed to the lower body of the well in such a way as to prevent entrance of water and other substances into the well. This is particularly important during a rainstorm, or when hosing off the surface about the well, or during melting of snow or ice on the surface. A cover must provide sealing against the entrance of water into the well. Water entering an underground fuel storage tank, as by leakage from the surface, prevents a serious problem. Upon entering a storage tank, water drops to the bottom of the tank, being heavier than gasoline. It is then the first liquid drawn from the bottom of the tank by the pumping system, and is transferred via dispensing pumps into vehicle tanks. Water in gasoline supplied to engine fuel injectors can effectively ruin the injectors and require expensive repairs. The removal of water from a storage tank involves substantial expense, such as $1.50 per gallon, for pumping out the water and transporting it to disposal.

The spill containment devices described in the patents mentioned above are somewhat deficient because they lack means for positively clamping their covers in fluid sealing relation to their spill containers. As a result, only gravity holds the covers closed, and it is possible that gravity may not be sufficient to cause the covers to seal properly to the spill containers. Also, the covers of the patented spill containers are vunerable to being accidentally dislodged by passage of a vehicle or snow plow over the covers.

Positively locking covers for various purposes are known, of course. One such cover is a removable cap assembly for closing the open end of a pipe, such as the open end of a storage tank fill tube. This locking cap assembly includes a cap proper and a releasable locking mechanism on the cap. The cap has an outer circular end wall and an inner annular rim projecting axially beyond the inner side of the end wall. The cap is designed to fit over the open end of a pipe having an external circumferential groove forming an annular shoulder facing axially of and away from the open end of the pipe. The cap locking mechanism includes a pair of diametrically opposed locking levers pivoted between their ends on the cap at its circumference on parallel pivot axes transverse to the axis of the cap. These locking levers extend along diametrically opposite sides of the cap externally of the cap and have axially outer ends extending axially of the cap beyond the axially outer side of the cap end wall and axially inner, radially inwardly directed hook-shaped ends extending axially of the cap beyond the axially inner end to the cap rim. The outer ends of the locking levers are joined by a pair of links which extend across the axially outer side of the cap end wall. These links have adjacent radially inner ends pivotally connected to one another and to a lock handle and distal radially outer ends pivotally connected to the axially outer ends of the locking levers.

When the cap is placed over the end of the pipe, inward locking movement of the lock handle axially of the cap and toward its end wall rotates the outer ends of the locking levers radially outward and therey rotates the inner hook-shaped ends of the arm radially inward to locking positions in which they engage the shoulder on the pipe to lock the cap to the pipe. The two links form a toggle joint between the levers whose adjacent end pivot moves past center to lock the levers in their locking positions during locking movement of the lock handle.

BRIEF DESCRIPTION OF THE INVENTION

According to is broader aspects, this invention provides an improved, locking cover assembly of the class described which avoids the above noted and other disadvantages of the existing covers of this class. The improved cover assembly includes a cover supporting base containing an opening circumferentially surrounded by a cover seat, and a cover for closing the opening. The cover includes a cover member proper movable to and from a closed position wherein the cover member engages the cover seat about and closes the base opening, and a novel cover locking mechanism on the cover member engagable with the base for releasably locking the cover member in its closed position. The cover locking mechanism comprises cover locking means mounted on the inner side of the cover member for operation between a cover locking state in which the locking means engages the base about its opening to lock the cover member in its closed position and a cover unlocking state in which the locking means releases the cover member for opening, and actuating means connected through the cover member to the inner cover locking means and accessible at the outer side of the cover member for operating the locking means between its locking and unlocking states. According to an important aspect of the invention, the locking mechanism forms toggle joint means which are set to releasably lock the locking means in its locking state by cover locking movement of the actuating means. According to another important feature of the invention, the locking mechanism, in addition to locking the cover member to the base, clamps the cover member firmly against the cover seat on the base to form a fluid tight seal between the cover member and the base.

In the presently preferred embodiments of the invention described herein, the actuating means comprises a plunger which is movable endwise through the cover member parallel to the central axis of the member. The cover locking means comprises a plurality of locking levers spaced circumferentially about and pivotally supported between their ends on the inner side of the cover member. These locking levers have inner ends which are pivotally connected to the actuating plunger in such a way that axial movement of the plunger inwardly toward and outwardly away from the cover member pivots the levers between cover locking and unlocking positions. The levers have outer ends which engage a locking edge on the base about its opening to clamp the cover member to the base when the levers occupy their cover locking positions. In the unlocking positions of the levers, their outer ends are retracted from the locking edge to release the cover member for opening. In one of these preferred embodiments, the locking levers are straight, pivotally supported on the base by pivots which extend through longitudinal slots in the levers, and pivotally connected at their inner ends directly to the actuating plunger in such a way that the levers are extended longitudinally outward during locking of the cover locking mechanism and retracted longitudinally inward during unlocking of the locking mechanism. In another preferred embodiment, the locking levers are bell crank levers whose inner ends are connected by pivotal links to the actuating plunger and whose outer ends rotate outwardly during locking of the locking mechanism and inwardly during unlocking of the locking mechanism.

As mentioned earlier, while the cover assembly of the invention may be used for a variety of purposes, its primary use is a closure for an underground tank servicing well of the class described. In this primary use, the supporting base of the cover assembly is sealed to the upper end of the well side wall. The cover locking mechanism, when locked, firmly clamps the cover member to the cover seat about the top access opening of the base to provide a fluid tight closure for the well. An important feature of the cover assembly with regard to this particular use resides in the fact that the upper surface of the cover member is recessed in such a way that the lock handle of the cover locking mechanism when in its locking position is flush with the cover surface so as to be shielded against damage by surface traffic, and particularly against being snagged by a snow plow moving over the cover. The cover recess which receives the lock handle in its locking position has open ends to facilitate hosing of mud and other debris from the recess before opening the cover.

DESCRIPTION OF THE PREFERRED EMBODIMENTS

Figure 1:
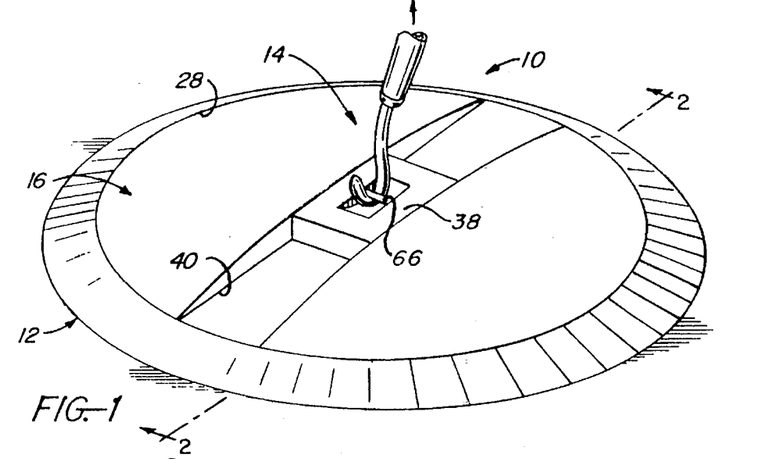
FIG. 1 is a perspective view of the upper side of cover assembly according to the invention.
Figure 2:
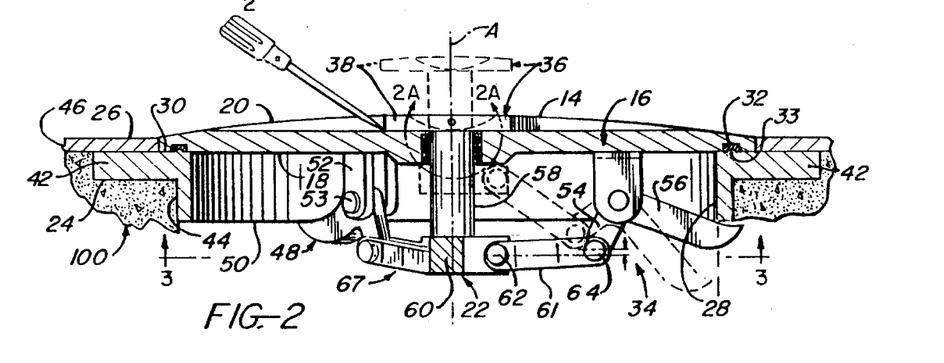
FIG. 2 is a sectional view taken at line 2—2 in FIG. 1.
Figure 3:
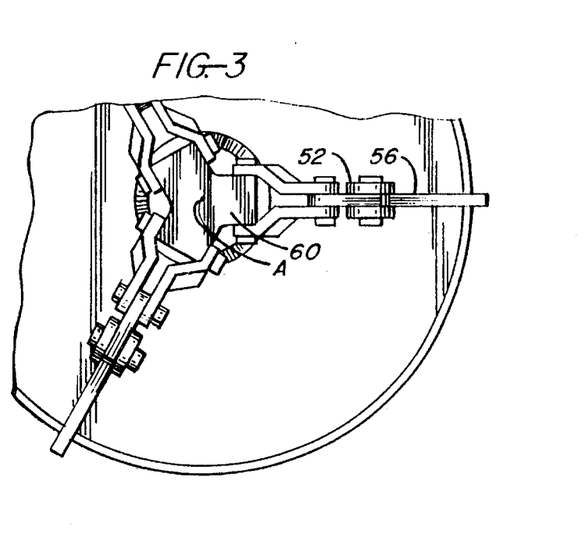
FIG. 3 is a view looking in the direction of the arrows on line 3—3 in FIG. 2.
Figure 4:
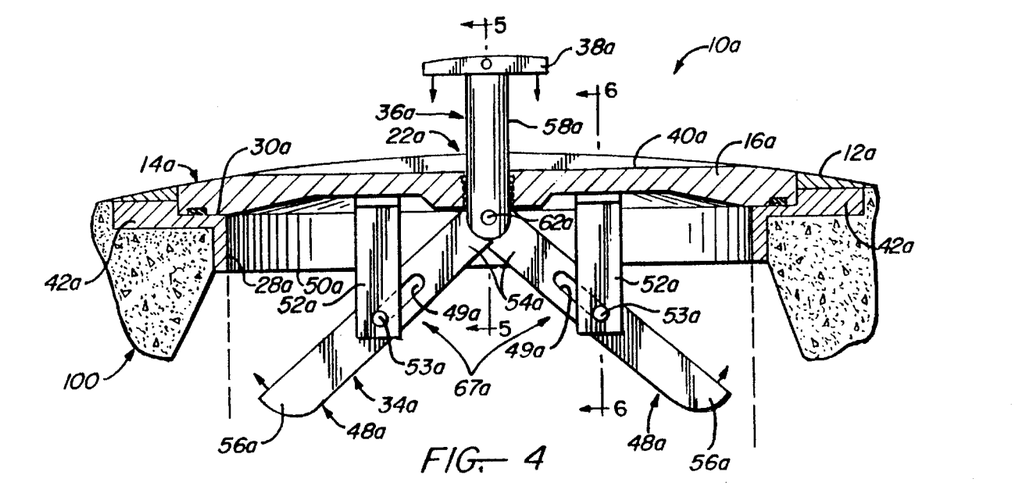
FIG. 4 is a section similar to FIG. 2 through a modified cover assembly according to the invention illustrating the cover locking mechanism in its unlocked condition.
Figures 5, 6:
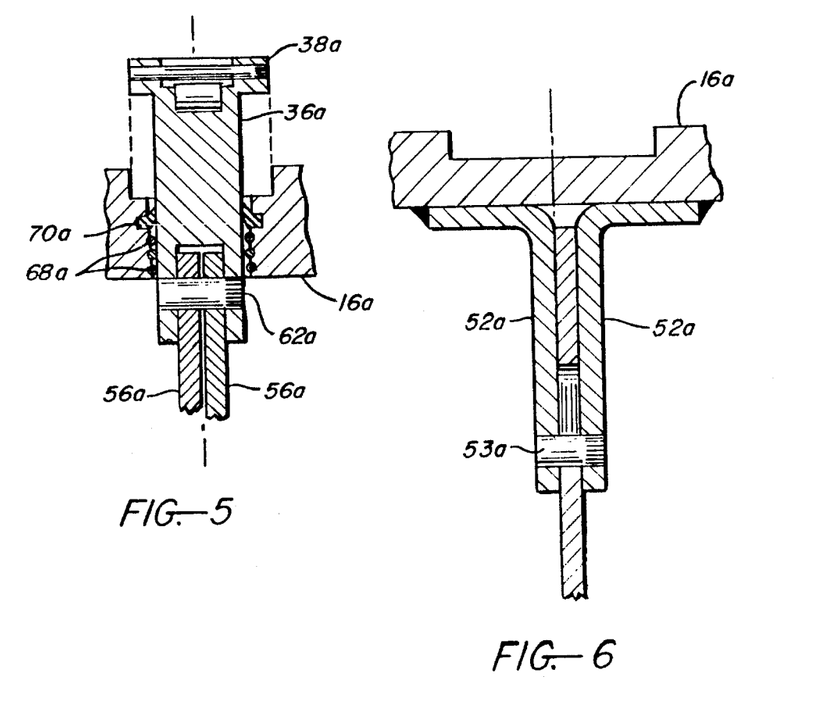
FIG. 5 is a section taken on line 5—5 in FIG. 4.
FIG. 6 is a section taken on line 6—6 in FIG. 4.
Figure 7:
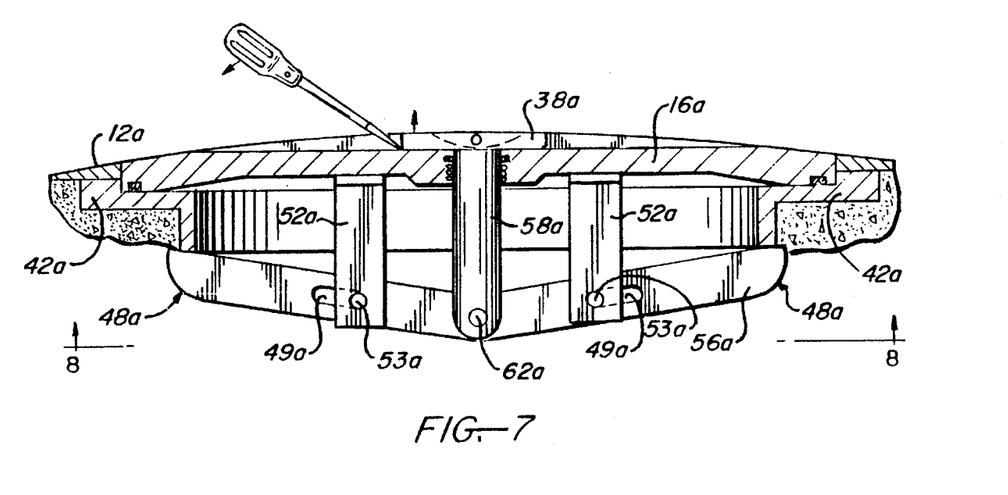
FIG. 7 is a section similar to FIG. 2 illustrating the cover locking means in its locking condition.
Figure 8:
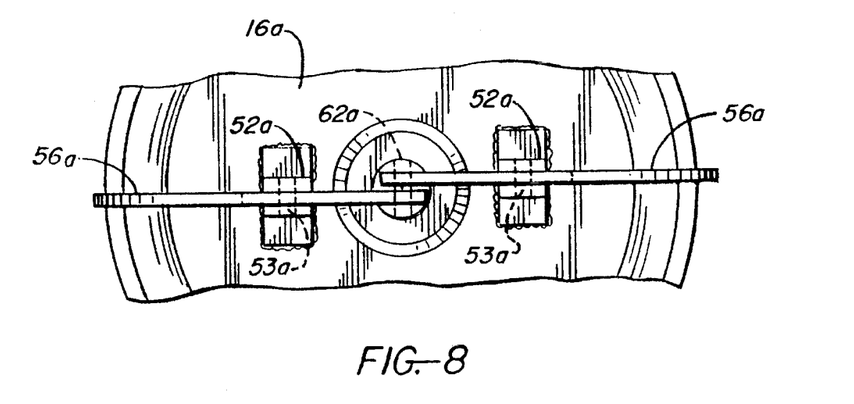
FIG. 8 is a view locking in the direction of the arrows on line 8—8 in FIG. 7.

Turning now to these drawings and first to FIGS. 1–3, the illustrated cover assembly 10 comprises a cover supporting base 12 and a cover 14 to be supported on the base. Cover 14 includes a cover member 16 having a normally inner side 18 (hereafter referred to as its lower side) and a normally outer side 20 (hereafter referred to as its upper side), and a cover locking mechanism 22 mounted on the cover member. The cover supporting base 12 has a normally inner side 24 (hereafter referred to as its lower side) and a normally outer side 26 (hereafter referred to as its upper side), and an opening 28 through these sides. About the base opening 28, at the upper side 26 of the base, is an annular cover seat 30 forming a planar seating surface on the base which faces axially upward relative to the base. In this case, the cover seat 30 is a flat annular surface disposed in a plane transverse to the central axis of the base opening 28.

Cover 14 is movable to and from its closed position of FIGS. 1 and 2 on the cover supporting base 12. A radially outer annular portion of the inner side 18 of the cover member 16 adjacent its outer perimeter forms a planar cover seating surface which engages the cover seat or base seating surface 30 to close the base opening 28 when the cover occupies its closed position. Contained within an annular groove in the lower side of the cover member 16 is a resilient seal ring 32 for sealing the cover member to the cover base. This seal ring is engagable with an upstanding sealing rib 33 on the cover seat 30 having a rounded seal engaging surface. As clearly shown in FIG. 3, the base seating surface 30 engages the confroning cover seating surface at radially opposite sides of the seal ring groove.

The cover locking mechanism 22 comprises locking means 34 on the lower side of the cover member 16 and lock actuating means 36 accessible at the upper side of the cover member for operating the locking means. The locking means 36 is operable between its solid line cover locking state and its broken line cover unlocking state of FIG. 2 by movement of the lock actuating means 36 between its solid line locking position and its broken line unlocking position of FIG. 2. Operation of the cover locking means 34 to its solid line cover locking state while the cover 14 occupies its closed position on the cover supporting base 12 locks the cover to the base in its closed position. Operation of the locking means to its cover unlocking state releases the cover for movement to an opening position in which the base opening 28 is uncovered.

According to one important feature of the invention, the cover locking means 34 and lock actuating means 36 form toggle joint means which move over-center during operation of the locking mechanism 22 from its broken line unlocking state to its solid line locking state of FIG. 2 to firmly lock the cover 14 in its closed position on the base. The cover is then firmly clamped in fluid sealing relation to the base. According to another feature, the lock actuating means 36 includes a lock handle 38 which is accessible at the upper side of the cover member 16 for moving the actuating means to operate the cover locking means 34 between its locking and unlocking states. When the actuating means occupies its broken line cover unlocking position of FIG. 2, this lock handle is located some distance above the upper side of the cover member, as shown. When the actuating means occupies its solid line cover locking position, the lock handle is situated within a recess or channel 40 in the upper side 20 of the cover member 16. The handle is then substantially flush with the upper surface of the cover member so as to be shielded against contact and damage by surface traffic, particularly by a snow plow which could easily catch on the handle if it projected even slightly above the cover member. Another feature of the invention resides in the fact that the recess 40 has open ends which permit dirt and other debris to be hosed out of the recess before unlocking the cover assembly.

Referring now in more detail to FIGS. 1–3 which illustrate a presently preferred embodiment of the invention, the cover supporting base 12 is a generally annular manhole-like part including an annular flange 42 and a coaxial cylindrical rim 44 projecting from the lower side of the flange. The flange and rim circumferentially surround the base opening 28. Rigidly joined to the upper side of the flange 42 coaxial with the flange is a ring 46. The ring tapers to a diminishing thickness radially from its inner edge to its outer edge, as shown. The inner edge of the ring is spaced radially outward from the edge of the base opening 28 to expose a radially inner annular portion of the base flange 42. This exposed portion of the flange forms the cover seat 30.

The cover member 16 has a relatively flat disc shape but tapers radially with a diminishing thickness from its center to its radially outer edge so that the cover member has a somewhat rounded convex upper surface which rises to a crest at the center of the cover member. The radially outer edge thickness of the cover member approximates the radially inner edge thickness of the base ring 46. The base ring has a relatively narrow knife-like radially outer edge. When the cover 14 is in its closed position on the supporting base 12, therefore, the upper surface of the cover member at its outer edge is substantially flush with the upper surface of the base ring.

The cover locking means 22 comprises a plurality (in this case three) cover locking members 48 spaced circumferentially about the cover member 16. These locking members are connected to the lock actuating means 36 for operation of the locking members between their solid line cover locking positions and broken line cover unlocking positions of FIG. 2 by movement of the actuating handle 38 between its solid line locking position and its broken line unlocking position. In their locking positions, these locking members press axially against the lower edge 50 of the base rim 44, which forms a locking edge on the base, to firmly clamp the cover member 16 against the base cover seat 30. When the locking members occupy their unlocking positions, they are retracted axially and radially inward from the base locking edge 50 to free the cover 14 for removal from the base.

In the preferred cover assembly 10 illustrated, the locking members 48 comprise locking levers spaced circumferentially about the edge of and extending generally radially of the cover member 16. The illustrated locking levers are bell crank levers which are pivoted at the juncture of their arms on brackets 52 rigidly joined to and depending from the lower side of the cover member. The axes of the lever pivots 53 are located in a common plane transverse to the central axis A of the cover member 16 and extend transverse to radial planes containing their respective levers and the axis A. The locking levers have radially inner ends 54 and radially outer ends 56. The levers are rotatable on their pivots between their solid line locking positions and broken line unlocking positions of FIG. 2. In their locking positions, the radially outer ends 56 of the levers engage and press axially against the base locking edge 50 to clamp the cover 14 to the base 12. In their unlocking positions, the outer arm ends are retracted axially and radially inward from the base locking edge to permit removal of the cover from the base.

Figure 2A:
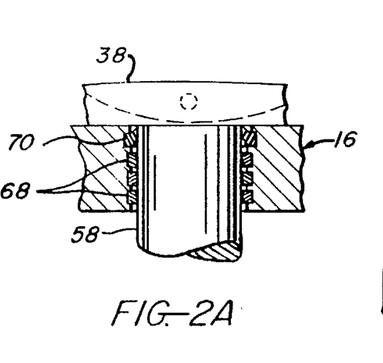
FIG. 2A is an enlarged fragmentary view of the area indicated by arrows 2A in FIG. 2.

The lock actuating means 36 comprise an actuating member or plunger including a shaft 58 which extends slidably through the cover member 16 along its central axis A. The plunger is movable endwise through the cover member between its solid line and broken line locking and unlocking positions of FIG. 2. Resilient annular seals 68 (FIG. 2A) are disposed in grooves in the opening wall and engage the plunger 58 to prevent entry and passage there-between of water and foreign substances. A wiper 70 is disposed in an appropriate groove in the opening above annular seals 68 to engage the plunger shaft to prevent passage of foreign substances, such as grit and dirt, through the cover opening.

The lock handle 38 comprises a cross bar at the upper end of the plunger shaft 58. At the lower end of the plunger shaft 58 is connecting block 60. The inner ends 54 of the cover locking lever 48 are connected to this block by connecting means 61 in the form of pivotal links. Links 61 are pivotally connected at their outer ends to the inner lever ends 54 and at their inner ends to the plunger connecting block 60.

From the foregoing description and the drawings, it will be understood that endwise movement of the lock actuating plunger 36 between its solid line locking position and its broken line unlocking position of FIG. 2, rotates the bell crank locking levers 48 on their pivots between their solid line cover locking positions and broken line cover unlocking positions. Rotation of the levers to their locking positions rotates the outer ends 56 of the levers radially outward and axially upward toward and against the base locking edge 50. As explained below, the base 12 and cover 14 are thereby clamped firmly together to lock the cover to and in fluid sealing relation with the base. Rotation of the locking levers to their unlocking positions rotates the outer arm ens 56 downwardly and radially inwardly away from the base locking edge 50 to positions in which the outer arm ends are located radially inward of the outer boundry of the base opening 28 to permit removal of the cover 14 from the base 12.

It will be observed in FIG. 2 that the radially inner pivots 62 of the connecting links 61 are located in a first common plane transverse to the plunger axis A. The outer link pivots 64 are located in a second common plane transverse to the plunger axis. During downward locking movement of the plunger, the inner link pivots 62 move downwardly relative to the outer link pivots 64 along direction lines parallel to and spaced laterally outward from the axis A. This downward movement of the inner link pivots 62 occurs downwardly across the common plane of the outer pivots 64 (where the inner pivots are located in on-center positions relative to the outer link pivots) to the solid line positions of FIG. 2 (where the inner pivots occupy over-center positions relative to the outer link pivots). Downward movement of the plunger to these over-center positions of the inner pivots 62 is limited by contact of the plunger handle 36 with the floor of the cover recess 40.

The cover locking mechanism 22 is so constructed and arranged that during downward locking movement of the plunger 36 through the cover member 16, the outer ends 56 of the bell crank locking levers 48 contact the base locking edge 50 just slightly before the inner link pivots 62 reach their on-center positions relative to the outer link pivots 64. The distances between the link pivots 62, 64 is slightly greater than the spacing between the outer link pivots 64 and the direction lines of movement of the inner link pivots 62 when the outer ends 56 of the bell crank levers 48 first contact the base locking edge 50. The cover locking mechanism 22 embodies sufficient resiliency to accommodate the above over-center movement of the inner link pivots 62 relative to the outer link pivots 64. From this description, it will be understood that the plunger 36, bell crank locking levers 48, and their pivots 53, 62, 64 form toggle joints 66 which are set, that is move over-center, to lock the levers in their cover locking positions of FIG. 2 by downward locking movement of the plunger through the cover member 16. The toggle joints are released by upward unlocking movement of the actuating plunger. The lock mechanism 22 may be easily released by using a screwdriver to pry the lock handle 38 upwardly or a hook to pull upwardly on a cross pin 66 within a recess in the upper side of the lock handle, as shown in FIG. 1.

In this latter regard, it will be seen that the plunger 36 includes means at its outer end, i.e. handle 38 and the cross pin 66, having inner surfaces at the underside of the handle and the underside of the cross pin, respectively, which face inwardly toward the inner end of the plunger 36 and are accessible at the outer side of the cover member 16 when the plunger occupies its cover locking position for engagement by an implement separate from the cover assembly for exerting an outward force on the plunger for moving the plunger outwardly relative to the cover to its cover unlocking position. Thus, as shown in FIG. 1, the recess in the outer end of the plunger handle 38 provides clearance space between the cross pin 66 and the handle for engagement of a hook with the under side or inner surface of the cross pin for exerting an outward pulling force on the plunger. As shown in FIG. 2, the recess or channel 40 in the outer surface of the cover member provides a clearance space at one side of the handle 38 for insertion of a prying implement, such as the illustrated screwdriver, between the underside or inner surface of the handle and the floor of the channel for prying the plunger 36 outwardly from its locking position. Because a separate implement is used to release the cover locking mechanism 22, the plunger 36 is the only part of the cover 14 which projects above or beyond the upper cover surface at any time. Accordingly, when the plunger occupies its cover locking position, no part of the cover projects above the upper cover surface. When the plunger occupies its cover unlocking position, the plunger is the only part of the cover extending beyond above the upper cover surface.

The modified cover assembly 10a of FIGS. 4–8 is essentially identical in many respects to the cover assembly 10 of FIGS. 1–3. For this reason, the parts of the cover assembly 10a are designated by the same reference numerals (with the suffix "a") as the corresponding parts of cover assembly 10. Cover assembly 10a comprises a cover supporting base 12a and a removable locking cover 14a for closing an opening 28a through the base. The base 12a is identical to the base 12 of the cover assembly except that the cover seating surface 30a of the base 12a is recessed into the upper side of the base flange 42a. The cover 14a includes a cover member 16a proper and a cover locking mechanism 22a on the cover member. The cover member 16a is identical to the cover member 16 of the cover assembly 10 except that the cover member 16a has a slightly different cross-section in planes containing the central axis of the cover, as is readily evident from a comparison of FIG. 2 and FIGS. 4 and 7. In the closed position of the cover 14a on the base 12a, the cover member 16a engages the cover seat 30a in fluid sealing relation to the base.

The major difference between the cover assembly 10a and the cover assembly 10 resides in the cover locking mechanism 22a of the cover assembly 10a. The cover locking mechanism 10a, like the cover locking mechanism 10, comprises cover locking means 34a on the lower side of the cover member 16a operable between a cover locking state (FIG. 7) and a cover unlocking state (FIG. 4), and lock actuating means 36a for operating the locking means between these states. In its cover locking state, the cover locking means 34a engages the base 12a about the base opening 28a for locking the cover 14a to the base. In its cover unlocking state, the cover locking means 34a releases the cover 14a for movement from its closed position on the base.

The cover locking means 34a comprises a pair of straight, diametrically opposed cover locking levers 48a which are spaced 180 degrees about the cover member 16a and extend radially of the cover member in a common plane containing the central axis A of the cover member. These diametrically opposed locking levers are pivoted between their ends on brackets 52a rigidly joined to and depending from the under side of the cover member 16a. The axes of the lever pivots 53a are located in a common plane transverse to the axis A and extend transverse to the common radial plane of the levers. Each pivot 53a extends through a longitudinal slot 49a in its respective locking lever 48a. Except as noted above, the cover assembly 10a is identical to the cover assembly 10 and embodies all of the earlier discussed features of the latter cover assembly.

The lock actuating means 36a comprises a lock actuating plunger including a shaft 58a extending slidably through the cover member 16a along its axis A and a cross bar handle 38a at the upper end of the shaft. The lower end of the plunger shaft 58a is pivotally connected to the radially inner ends 54a of the lever arms 46a by connecting means 62a in the form of a common pivot. The axis of pivot 62a parallels the axes of the lever pivots 53a. The plunger 36a is movable upwardly in the drawings in a cover unlocking movement to its cover unlocking position of FIG. 4 and downwardly in a cover locking movement to its cover locking position of FIG. 7. Resilient annular seals 68a are disposed in grooves in the cover opening and engage the plunger shaft 58a (FIG. 5) to prevent entry of water through the cover opening. A wiper 70a is disposed in a groove in the cover opening above the annular seals to engage the plunger shaft to prevent passage of foreign substances, such as grit and dirt.

It will be understood from the foregoing description and from the drawings that downward locking movement of the lock actuating plunger 36a rotates the cover locking levers 48a on their pivots 53a in directions to move the outer lever ends 56a upwardly toward the base locking edge 50a and simultaneously extends the levers longitudinally outward relative to the lever pivots 53a to positions in which the lever pivots engage the inner ends of their lever slots 49a. Upward unlocking movement of the lock actuating plunger 36a rotates the cover locking levers 48a on their pivots 53a in the opposite directions to move the outer lever ends 56a downwardly away from the base locking edge 50a and simultaneously retracts the levers longitudinally inward relative to their pivots 53a. During downward locking movement of the plunger 36a, the plunger pivot 62a moves along the common axis A of the plunger and the cover member 16a and to the over-center position of FIG. 7 relative to the lever pivots 53a; that is to say, the plunger pivot 62a moves downwardly across the common plane of the lever pivots 53a (the on-center position of the plunger pivot relative to the lever pivots) to the solid line position of FIG. 7 (the over-center position of the plunger pivot relative to the lever pivots). Downward movement of the plunger is limited to the over-center position by contact of the plunger handle 38a with the bottom of the handle recess 40a.

The cover locking mechanism 22a is so constructed and arranged that during downward locking movement of the plunger 36a, the outer ends 56a of the locking levers 48a contact the base locking edge 50a just slightly before the plunger pivot 62a reaches its on-center position relative to the lever pivots 53a. The distances between the plunger pivot 62a and the lever pivots 53a when the lever pivots initially contact the inner ends of their lever slots 49a is slightly greater than the normal distances (shown in FIG. 4) between the lever pivots and the plunger axis A measured in the common plane of the lever pivots. The locking mechanism 22a embodies sufficient resiliency to accommodate the above over-center movement of the plunger pivot 62a relative to the outer pivots 64. From this description, it will be understood that the plunger 36a, locking levers 48a, and their pivots 43a, 62a form toggle joints 66a which are set, that is move over-center, to lock the levers in their cover locking positions of FIG. 7 by downward locking movement of the plunger through the cover member 16a. The toggle joints are released by upward unlocking movement of the actuating plunger. The lock mechanism 22a may be easily released in the same manner as the cover lock mechanism 22.

As noted earlier, cover assemblies of the invention may be used for a variety of purposes. In FIGS. 1–8 the cover assemblies 10, 10a are mounted within the open tops of concrete wells 100 and serve effectively as manhole cover assemblies for closing the open tops of the wells. These wells are assumed to be servicing wells of the kind discussed earlier for underground fuel storage tanks (not shown). The servicing wells enclose the fill tubes and vent tubes (not shown) for the underground fuel storage tanks. The cover assemblies are recessed into the tops of the wells in such a way that the tops of the cover assemblies are substantially flush with the surrounding ground surface. Normally, the covers 14, 14a of the cover assemblies will be locked closed with the lock handles 38, 38a flush with the upper surfaces of the cover members 16, 16a. The fill tubes and vent tubes within the well are accessed for filling the underground tanks by pulling up on the lock handles and removing the covers.

I claim:

1. A cover assembly comprising:

a cover including a cover member having inner and outer sides, and a cover locking mechanism on said cover member, a base member having inner and outer sides, and an opening through said base sides, and wherein said cover member is movable to and from a closed position on said base member, said cover locking mechanism comprises (a) cover locking means on the inner side of said cover member operable between a cover locking state and a cover unlocking state such that operation of said locking means to its cover locking state while said cover member occupies its closed position locks the cover member in said closed position on said base, and operation of said locking means to its cover unlocking state releases the cover member to open, and (b) lock actuating means accessible at the outer side of and extending through said cover member for operating said locking means between said locking and unlocking states, said cover member has a planar seating surface on the inner side of the cover member and said base has a planar seating surface on the outer side of said base about said opening, which seating surfaces abut one another about said opening when said cover occupies its closed position, one of said seating surfaces has an annular seal ring groove which opens toward the other seating surface in surrounding relation to said opening when said cover occupies its closed position and a seal ring in said groove, and the other seating surface engages said one seating surface at radially opposite sides of said groove and has an upstanding annular rib which projects into said groove and engages said seal ring when said cover occupies its closed position.

2. A cover assembly according to claim 1, wherein:

said one seating surface is on said cover member and said other seating surface is on said base member.

3. A cover assembly comprising a cover including a cover member having normally inner and outer sides, and a cover locking mechanism on said cover member, a base for receiving said cover having normally inner and outer sides, an opening through said base sides, and a cover seat about said opening at the outer side of the base, and wherein said cover is movable to and from a closed position on said base wherein said cover member engages said seat and closes said opening, said cover locking mechanism comprises (a) cover locking means on the inner side of said cover member operable between a cover locking state and a cover unlocking state such that operation of said locking means to its cover locking state while said cover member occupies its closed position locks the cover member in said closed position, and operation of said locking means to its cover unlocking state releases the cover member to open, and (b) lock actuating means accessible at the outer side of and extending through said cover member for operating said locking means between said locking and unlocking states, said actuating means comprises an elongate plunger extending through said cover member with the longitudinal axis of the plunger transverse to said inner and outer sides of the cover member and movable along said axis between locking and unlocking positions relative to the cover member, said base has an annular locking edge at the inner side of the base about and facing axially of said opening, said cover locking means comprises elongate locking levers spaced about and extending generally laterally of said axis whereby said levers have inner ends adjacent said axis and opposite outer ends, first pivot means on the inner side of said cover member extending through longitudinal slots in said levers and mounting said levers between their ends on the inner side of said cover member for combined endwise movement of the levers and rotation of the levers on first pivot axes transverse to the respective levers and to said longitudinal axis between locking positions wherein the outer ends of said levers engage said locking edge when said cover member occupies its closed position to lock the cover member in its closed position and unlocking positions wherein said outer lever ends are retracted from said locking edge to permit opening of said cover member, and second pivot means connecting said plunger and the inner ends of said levers whereby said levers undergo combined rotation and endwise movement between their locking positions and unlocking positions upon movement of said plunger between its locking and unlocking positions, upon movement of said plunger between its locking and unlocking positions, said first pivot means are located in a common plane transverse to said longitudinal axis, and said second pivot means moves through an on-center position in said plane during movement of said plunger between said unlocking and locking positions, the distance between said second pivot means and the adjacent inner end of the slot in each lever is slightly greater than the distance between said second pivot means and each first pivot means in said on-center position, and said cover locking means are sufficiently resilient to permit movement of said second pivot means across said common plane, and said locking mechanism includes means for limiting locking movement of said plunger from its unlocking position to its locking position, whereby said plunger, pivots, and levers form toggle joints which move over-center to lock said levers in their locking positions upon movement of said plunger from its unlocking position to its locking position.

4. A cover assembly according to claim 3 wherein:

said plunger has an outer end, and said cover member has a recess in its outer side which receives said outer plunger end in a position wherein the outer plunger end is substantially flush with the outer side of the cover member when said plunger occupies its locking position.

5. A cover assembly comprising:

a cover including a cover member having inner and outer sides, an outer surface which covers a major portion of said outer side, and a cover locking mechanism on said cover member, a base for receiving said cover having inner and outer sides, an opening through said base sides, and a cover seat about said opening at the outer side of the base, and wherein said cover is movable to and from a closed position on said base wherein said cover member engages said seat and closes said opening, said cover locking mechanism comprises (a) an elongate plunger extending through said cover member transverse to said cover sides, said plunger having an outer end at the outer side of said cover member and an inner end at the inner side of the cover member and being movable inwardly relative to said cover member to a cover locking position and outwardly relative to said cover to a cover unlocking position, and (b) cover locking means at the inner side of said cover member connected to the inner end of said plunger for operation to a cover locking state upon movement of said plunger to its cover locking position and to a cover unlocking state upon movement of said plunger to its cover unlocking position such that operation of said locking means to its cover locking state while said cover member occupies its closed position locks the cover member in said closed position, and operation of said locking means to its cover unlocking state releases the cover member to open, and wherein said outer plunger end is substantially flush with said outer cover surface when said plunger occupies its cover locking position, and said plunger includes means at its outer end accessible at the outer side of said cover member when said plunger occupies its cover locking position for engagement by an implement separate from said cover assembly for exerting an outward axial force on the plunger for moving said plunger outwardly relative to the cover and to its cover unlocking position.

6. A cover assembly according to claim 5, wherein:

said means at the outer end of said plunger for engagement by an implement comprises a handle on the outer end of said plunger including means accessible by said implement at the outer side of said cover member when the plunger occupies its cover locking position.

7. A cover assembly according to claim 1 wherein:

said actuating means comprises an elongate actuating member extending through said cover member along an axis transverse to said inner and outer sides of the cover member and movable along said axis between locking and unlocking positions relative to the cover member, said base has locking edge means at the inner side of the base about and facing axially of said opening, and said cover locking means comprises locking levers spaced about and extending laterally of said axis, whereby said levers have inner ends adjacent said axis and opposite outer ends, pivot means mounting said levers between their ends on the inner side of said cover member for rotation of the levers between locking positions wherein the outer ends of said levers engage said locking edge means when said cover member occupies its closed position to lock the cover member in its closed position and unlocking positions wherein said outer lever ends are retracted from said locking edge means to permit opening of said cover member, and connecting means joining said actuating member and the inner ends of said levers for effecting rotation of said levers between their locking positions and unlocking positions upon movement of said actuating member between its locking and unlocking positions.

8. A cover assembly according to claim 6, wherein:

said cover includes a recess entering said outer cover surface which receives said plunger handle in a position wherein the handle is substantially flush with said cover surface when said plunger occupies its cover locking position.

9. A cover assembly according to claim 5, wherein:

said plunger has an outer end face and a recess entering said end face, and said means engagable by said implement comprises a member extending across said recess in said plunger end face.

10. A cover assembly according to claim 1 wherein:

said actuating means comprises an elongate plunger extending through said cover member along an axis transverse to said inner and outer sides of the cover member and movable along said axis through the cover member between locking and unlocking positions relative to the cover member, said base has an annular locking edge at the inner side of the base about and facing axially of said opening, and said cover locking means comprises locking levers spaced about and extending laterally of said axis whereby said levers have inner ends adjacent said axis and opposite outer ends, pivot means mounting said levers between their ends on the inner side of said cover member for rotation of the levers between locking positions wherein the outer ends of said levers engage said locking edge when said cover member occupies its closed position to lock the cover member in its closed position and unlocking positions wherein said levers are retracted from said locking edge to permit opening of said cover member, and connecting links having inner ends pivotally connected to said plunger and outer ends pivotally connected to the inner ends of said levers for effecting rotation of said levers between their locking positions and unlocking positions upon movement of said plunger between its locking and unlocking positions.

11. A cover assembly according to claim 5, wherein:

said cover member has a recess entering said outer cover surface which receives said outer plunger end when said plunger occupies its cover locking position.

12. A cover assembly according to claim 5, wherein:

said base has an annular surface at the outer side of the base circumferentially surrounding said cover seat and disposed in a plane parallel to and spaced outwardly a distance from said cover seat, and said cover member has a peripheral edge whose thickness approximates said distance and said outer cover surface is convexly rounded from said edge to a crest at the center of the cover member, whereby said outer cover surface is substantially flush with said annular surface of said base when said cover occupies said closed position.

13. A cover assembly according to claim 11 wherein:

said plunger has an outer end, and said cover member has a recess in its outer side which receives said outer plunger end in a position wherein the outer plunger end is substantially flush with the outer side of the cover member when said plunger occupies its locking position.

14. A cover assembly comprising:

a cover including a cover member having inner and outer sides, an outer surface which covers a major portion of said outer side, and a cover locking mechanism on said cover member, an annular base for receiving said cover having inner and outer sides, an opening through said base sides, and an annular cover seat about said opening at the outer side of the base, and wherein said cover is movable to and from a closed position on said base wherein said cover member engages said seat and closes said opening, said cover locking mechanism comprises (a) an elongate plunger extending through said cover member transverse to said cover sides, said plunger having an outer end at the outer side of said cover member and an inner end at the inner side of the cover member and being movable endwise relative to said cover member between cover locking and unlocking positions, and (b) cover locking means at the inner side of said cover member connected to the inner end of said plunger for operation to a cover locking state upon movement of said plunger to its cover locking position and to a cover unlocking state upon movement of said plunger to its cover unlocking position such that operation of said locking means to its cover locking state while said cover member occupies its closed position locks the cover member in said closed position, and operation of said locking means to its cover unlocking state releases the cover member to open, said outer plunger end extends beyond said outer cover surface when said plunger occupies its cover unlocking position, and said outer plunger end is substantially flush with said outer cover surface when said plunger occupies its cover locking position, said outer plunger end is the only part of said cover which extends beyond said outer cover surface at any time, whereby when said plunger occupies its cover locking position no part of said cover extend beyond said cover surface and when said plunger occupies its cover unlocking position the outer plunger end is the only part of the cover extending beyond said outer cover surface, said plunger includes means at its outer end which is accessible at the outer side of said cover member when said plunger occupies its cover locking position for engagement by an implement separate from said cover assembly for moving said plunger outwardly relative to the cover and to its cover unlocking position, said means at the outer end of said plunger for engagement by an implement comprises a handle on the outer end of said plunger including means accessible by said implement at the outer side of said cover member when the plunger occupies its cover locking position, said cover member includes a recess entering said outer cover surface which receives said plunger handle in a position wherein the handle is substantially flush with said cover surface when said plunger occupies its cover locking position, and said recess provides clearance at one side of said handle for insertion of a prying implement between said handle and the floor of said recess to pry said plunger outwardly when said plunger occupies its cover locking position.

15. A cover assembly according to claim 5, wherein:

said outer plunger end extends beyond said outer cover surface when said plunger occupies its cover unlocking position, and said outer plunger end is the only part of said cover which extends beyond said outer cover surface at any time, whereby when said plunger occupies its cover locking position no part of said cover extends beyond said cover surface and when said plunger occupies its cover unlocking position the outer plunger end is the only part of the cover extending beyond said outer cover surface.

16. A cover assembly according to claim 5, wherein:

said means at the outer end of said plunger which is accessible for engagement by said implement comprises a surface on the outer end of said plunger facing the inner end of the plunger.

17. A cover for a cover assembly including a cover supporting base for receiving said cover in a closed position wherein said cover closes an opening through the base, said cover comprising:

a cover member having normally inner and outer sides, and a cover locking mechanism on said cover member, and wherein said cover locking mechanism comprises (a) cover locking means on the inner side of said cover member operable between a cover locking state and a cover unlocking state, and (b) lock actuating means accessible at the outer side of and extending through said cover member for operating said locking means between said locking and unlocking states, said actuating means comprises an elongate plunger extending through said cover member with the longitudinal axis of the plunger transverse to said inner and outer sides of the cover member and movable along said axis between locking and unlocking positions relative to the cover member, said cover locking means comprises elongate locking levers spaced about and extending generally laterally of said axis whereby said levers have inner ends adjacent said axis and opposite outer ends, first pivot means on the inner side of said cover member extending through longitudinal slots in said levers and mounting said levers between their ends on the inner side of said cover member for combined endwise movement of the levers and rotation of the levers on first pivot axes transverse to the respective levers and to said longitudinal axis between locking and unlocking positions, and second pivot means connecting said plunger and the inner ends of said levers whereby said levers undergo combined rotation and endwise movement between their locking positions and unlocking positions upon movement of said plunger between its locking and unlocking positions, said first pivot means are located in a common plane transverse to said longitudinal axis, and said second pivot means moves through an on-center position is said plane during movement of said plunger between said unlocking and locking positions, the distance between said second pivot means and the adjacent inner end of the slot in each lever is slightly greater than the distance between said second pivot means and each first pivot means in said on-center position, and said cover locking means are sufficiently resilient to permit movement of said second pivot means across said common plane, and said locking mechanism includes means for limiting locking movement of said plunger from its unlocking position to its locking position, whereby said plunger, pivots, and levers form toggle joints which move over-center to lock said levers in their locking positions upon movement of said plunger from its unlocking position to its locking position.

18. A cover according to claim 17, wherein:

said means at the outer end of said plunger for engagement by an implement comprises a handle on the outer end of said plunger including means accessible by said implement at the outer side of said cover member when the plunger occupies its cover locking position.

19. A cover for a cover assembly including a cover supporting base for receiving said cover in a closed position wherein said cover closes an opening through the base, said cover comprising:

a cover member having inner and outer sides, an outer surface which covers a major portion of said outer side, and a cover locking mechanism on said cover member, and wherein said cover locking mechanism comprises (a) an elongate plunger extending through said cover member transverse to said cover sides, said plunger having an outer end at the outer side of said cover member and an inner end at the inner side of the cover member and being movable inwardly relative to said cover member to a cover locking position and outwardly relative to said cover member to a cover unlocking position, and (b) cover locking means at the inner side of said cover member connected to the inner end of said plunger for operation to a cover locking state upon movement of said plunger to its cover locking position and to a cover unlocking state upon movement of said plunger to its cover unlocking position, said outer plunger end is substantially flush with said outer cover surface when said plunger occupies its cover locking position, and said plunger includes means at its outer end accessible at the outer side of said cover member when said plunger occupies its cover locking position for engagement by an implement separate from said cover assembly for exerting an outward axial force on the plunger for moving said plunger outwardly relative to the cover and to its cover unlocking position.

20. A cover according to claim 18, wherein:

said cover includes a recess entering said outer cover surface which receives said plunger handle in a position wherein the handle is substantially flush with said cover surface when said plunger occupies its cover locking position.

21. A cover according to claim 20, wherein:

said recess comprises a channel extending diametrically across the outer side of the cover and opening endwise at its ends whereby debris may be hosed from the channel.

22. A cover according to claim 19 wherein:

said locking means includes pivoted cover locking levers.

23. A cover according to claim 19, wherein:

said plunger has an outer end face and a recess entering said end face, and said means engagable by said implement comprises a member extending across said recess in said plunger end face.

24. A cover according to claim 23, wherein:

said recess comprises a channel extending diametrically across said cover member and opening endwise at its ends, whereby debris may be hosed from the channel.

25. A cover assembly according to claim 23, and further including:

a wiper member disposed on the cover member and engaging said actuating member to prevent entry of water and foreign matter therebetween.

26. A cover according to claim 19, wherein:

said outer plunger end extends beyond said outer cover surface when said plunger occupies its cover unlocking position, and said outer plunger end is the only part of said cover which extends beyond said outer cover surface at any time, whereby when said plunger occupies its cover locking position no part of said cover extends beyond said cover surface and when said plunger occupies its cover unlocking position the outer plunger end is the only part of the cover extending beyond said outer cover surface.

27. A cover according to claim 19, wherein:

said means at the outer end of said plunger which is accessible for engagement by said implement comprises a surface on the outer end of said plunger facing the inner end of the plunger.

28. A cover for a cover assembly including a cover supporting base for receiving said cover in a closed position wherein said cover closes an opening through the base, said cover comprising:

a cover member having inner and outer sides, an outer surface which covers a major portion of said outer side, and a cover locking mechanism on said cover member, and wherein said cover locking mechanism comprises (a) an elongate plunger extending through said cover member transverse to said cover sides, said plunger having an outer end at the outer side of said cover member and an inner end at the inner side of the cover member and being movable endwise relative to said cover member between cover locking and unlocking positions, and (b) cover locking means at the inner side of said cover member connected to the inner end of said plunger for operation to a cover locking state upon movement of said plunger to its cover locking position and to a cover unlocking state upon movement of said plunger to its cover unlocking position, said outer plunger end extends beyond said outer cover surface when said plunger occupies its cover unlocking position, and said outer plunger end is substantially flush with said outer cover surface when said plunger occupies its cover locking position, said outer plunger end is the only part of said cover which extends beyond said outer cover surface at any time, whereby when said plunger occupies its cover locking position no part of said cover extends beyond said cover surface and when said plunger occupies its cover unlocking position the outer plunger end is the only part of the cover extending beyond said outer cover surface, said plunger includes means at its outer end which is accessible at the outer side of said cover member when said plunger occupies its cover locking position for engagement by an implement separate from said cover assembly for moving said plunger outwardly relative to the cover and to its cover unlocking position, said means at the outer end of said plunger for engagement by an implement comprises a handle on the outer end of said plunger including means accessible by said implement at the outer side of said cover member when the plunger occupies its cover locking position, said cover member includes a recess entering said outer cover surface which receives said plunger handle in a position wherein the handle is substantially flush with said cover surface, and said recess provides clearance at one side of said handle for insertion of a prying implement between said handle and the floor of said recess to pry said plunger outwardly when said plunger occupies its cover locking position.

* * * * *